United States Patent [19]

Benser

[11] Patent Number: 5,002,389

[45] Date of Patent: Mar. 26, 1991

[54] PULSED FLUORESCENCE VELOCIMETER

[75] Inventor: Earl T. Benser, Minneapolis, Minn.

[73] Assignee: Honeywell Inc., Minneapolis, Minn.

[21] Appl. No.: 288,350

[22] Filed: Dec. 22, 1988

[51] Int. Cl.[5] .......................... G01P 3/36; G01J 3/30; G01T 1/20

[52] U.S. Cl. .................................... 356/28; 356/318; 250/362; 250/364; 250/573

[58] Field of Search .................... 356/28, 28.5, , 317, 356/318; 250/356.1, 361 R, 362, 364, 573; 73/861.05, 861.06

[56] References Cited

U.S. PATENT DOCUMENTS

| 4,251,733 | 2/1981 | Hirleman, Jr. | 356/335 X |
| 4,483,614 | 11/1984 | Rogers | 356/28.5 |
| 4,506,979 | 3/1985 | Rogers | 356/28.5 |
| 4,572,667 | 2/1986 | Rogers | 356/317 |
| 4,807,990 | 2/1989 | Keefer | 356/28.5 |

FOREIGN PATENT DOCUMENTS 14509911 9/1976 United Kingdom .
2841499 3/1980 Germany .

OTHER PUBLICATIONS

Stevenson et al., "A Laser Velocimeter Using Laser-Induced Fluorescence", *Applied Physics Letters*, vol. 27, No. 7, 1 Oct. 1975, pp. 395-396.

"Velocity Measurements by Vibrational Tagging and Fluorescent Probing of Oxygen," Optics Letters, vol. 12, No. 11, Nov. 1987, pp. 861-863, by R. Miles et al.

"Digital Imaging of Reaction Zones in Hydrocarbon-Air Flames Using Planar Laser-Induced Fluorescence of CH and $C_2$," Optics Letters, vol. 11, No. 3, Mar. 1986, by M. G. Allen et al.

"Two-Frequency Laser-Induced Fluorescence Technique for Rapid Velocity-Field Measurements in Gas Plows," Optics Letters, vol. 10, No. 5, May 1985, by B. Hiller et al.

"OH Rotational Temperature from Two-Line Laser-Excited Fluorescence," Applied Optics, vol. 20, No. 7, Apr. 1981, by R. Cattolica.

*Primary Examiner*—Thomas H. Tarcza
*Assistant Examiner*—Linda J. Wallace
*Attorney, Agent, or Firm*—John G. Shudy, Jr.

[57] ABSTRACT

A noninvasive pulsed fluorescence gas velocimeter that determines dynamic parameters of a gas flow from detection of fluorescent re-radiation of excited molecules of the gas. The present invention has higher altitude capability than devices that utilize particulate scattering. The velocimeter requires no probes and utilizes a laser or other light source that does not perturb the gas flow being measured.

22 Claims, 3 Drawing Sheets

PULSED FLUORESCENCE VELOCIMETER

BACKGROUND OF THE INVENTION

The present invention pertains to velocimeters. In particular, the invention pertains to noninvasive velocity sensing of gas flow. More particularly, the invention is a gas velocimeter that utilizes fluorescence in sensing techniques.

Present techniques for air data measurement mainly rely on external probes, such as in aircraft, to measure total and static pressures and temperatures which are used to derive required air data parameters. In certain environments, such as high speed aircraft or spacecraft, such probes are impractical where the invasive nature of the probe results in severe heating of the probe and ultimate destruction of the probe. In advanced supersonic and hypersonic flights of aircraft, the energy of the gas or air flow is sufficient to result in a prohibitively high rate of heat deposition on the probe.

Military missions often require aircraft having minimum radar and electro-optic scattering cross sections. These cross sections are significantly increased by the use of external probes. The present invention is physically noninvasive as no types of external probes are required. Only moderate levels of laser power are used to interrogate the flow of atmosphere gases. Thus, the invention provides increased military or space survivability when compared with conventional velocimeters.

Other art, such as advanced optical devices, has been developed to attain noninvasive measurement of gas flow parameters. Most of these devices rely on the scattering of photons from particles within the flow being measured. The latter devices include laser velocimeters in the present art. However, such devices are unattractive for use at high altitudes because the density of particles of appropriate size satisfactory for device operation decreases rapidly with altitude.

The present invention is much less sensitive to such density decrease of particles, since it relies on inelastic scattering from molecular constituents within the flow.

SUMMARY OF THE INVENTION

Effective noninvasive sensing of gas flow external to aircraft spacecraft and other vehicles, for obtaining information such as air data, is achieved by the present invention. Air data include dynamic pressure, Mach number, free stream temperature and flow angles, among other characteristics. Such air data are required by an aircraft flight control system for accurate determination of surface forces and other aerodynamic properties. Additionally, the invention may used for many other gas sensing applications.

The present invention is based on laser-induced fluorescence in the gas flow. Laser or other radiation is focused into the volume of gas being measured to induce fluorescent. The invention depends on fluorescence scattering from naturally occurring atmospheric molecular constituents, rather than particulate constituents, which have a large density decrease with altitude, thus resulting in higher operational altitudes than other velocimeters of the related art. The density cross section product for fluorescent processes on molecules is significantly higher than those that depend on particulate scattering. The higher product results in a greater sensor signal-to-noise ratio.

Another advantage of the invention is that it does not require a coherent laser source for operation. Although lasers are an excellent source, any source having sufficient power at the chosen wavelength and a capability for focusing to a sufficiently small spot size, may be used. The wide latitude in the kind of power sources usable in the invention results in low cost construction.

DESCRIPTION OF THE PREFERRED EMBODIMENT

Figure 1A:
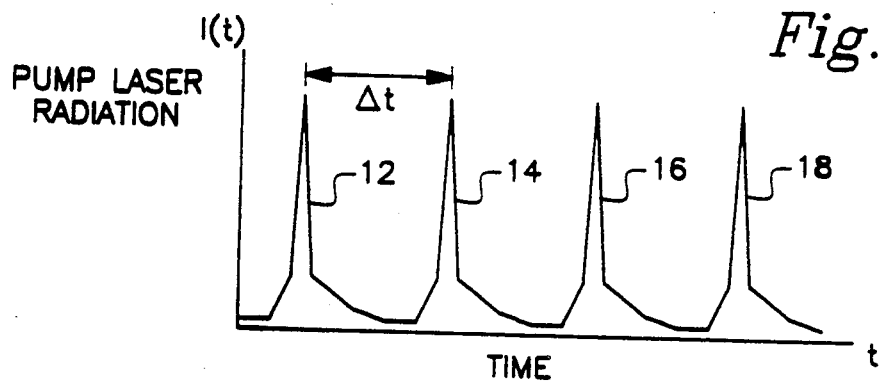
FIG. 1a is a profile of the output of the light source of the present invention.
Figure 1B:
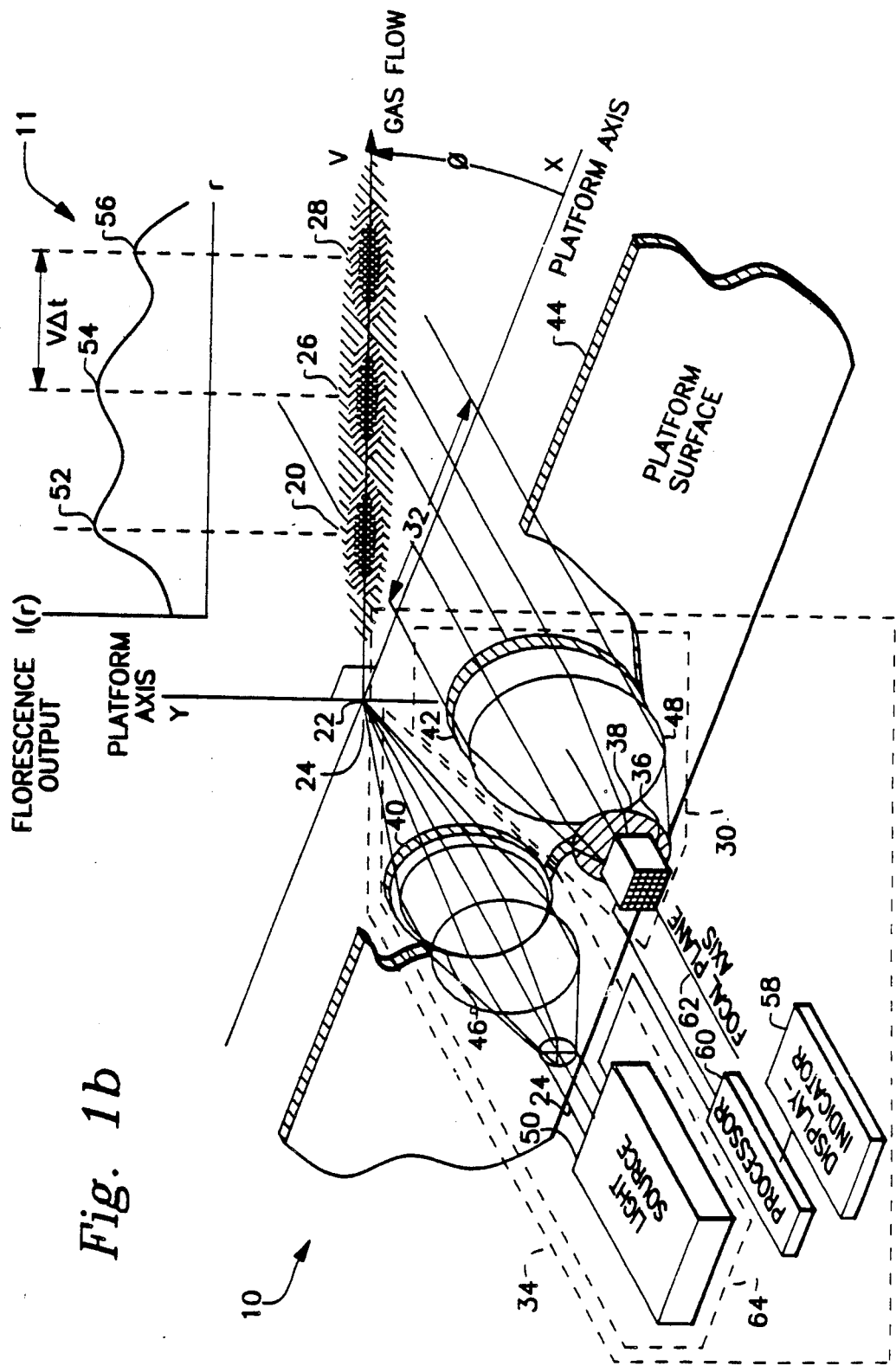
FIG. 1b shows a diagram of an embodiment of the present invention plus a graph of the fluorescent output of excited molecules of the measured atmospheric gas flow.

FIGS. 1a, 1b, 2a, 2b and 2c illustrate the preferred embodiment 10 of the present invention. In FIGS. 1a and 1b, laser signals 12, 14, 16 and 18, provided by light projection means 64, having light source 50 and optical system 46, and each having a short pulse width and high peak power, occur at a period of time ($\Delta t$) apart at a high repetition rate and illuminate a gas flow at areas 20, 26 and 28, focused at 22. At focused region 22, molecular constituents 20, 26 and 28 (for examples, $NO_2$, OH, etc.) of the atmospheric gas flow absorb illuminating radiation and are raised to an excited molecular state. Laser 24, which may be a pump laser, is a short wavelength laser (i.e., 193 to 600 nanometers (nm)). Each irradiated molecule re-emits photons at a typically lower energy (with a longer wavelength), having a time delay determined by the type of molecular scatterer. The operational pressure and temperature determine the amount of collational deactivization of the excited state. The delayed molecular emission results in a sequence of fluorescence-emitting light sources 20, 26 and 28, which move across field of view 32 of imaging sensor 30 which operates at a wavelength suitable for sensing the selected molecular fluorescence re-radiation.

Sensor 30 incorporates photo array 36 having sensors in two dimensions, which is sensitive to the emitted wavelength of the excited molecules 20, 26 and 28 which are within field of view 32, which emit a longer wavelength than that of the wavelength of laser beam 24. For instance, a 390 nm laser may result in emissions from the molecules at 410–420 nm. Yet, there may be 390 nm scattering from focused laser spot 22 in the gas. However, so that array 36 does not pick up signals from laser beam 24, a Rayleigh filter 38 is utilized to prevent transmittance of signals having laser beam 24 wavelength and to allow transmittance of emitted radiation from excited molecules 20, 26 and 28. In lieu of the Rayleigh filter, sensor 30 may be time-gated so as not to be detecting at the time of the laser pulse. Windows 40 and 42 are physically matched to the surface 44 of the craft or platform so as to avoid any protrusion beyond the craft. Windows 40 and 42 allow transmittance of laser beam 24 and receipt of light from molecules 20, 26 and 28. Windows 40 and 42 may be made from glass, quartz or other appropriate materials. Appropriate focusing of laser beam 24 is provided by optical system 46 and the received signal is focused on to array 36 by optical system 48. Optical systems 46 and 48 need not be co-planar but merely have fields-of-view that cover, though not necessarily simultaneously, the same area of the observed gas flow.

Figure 2A:
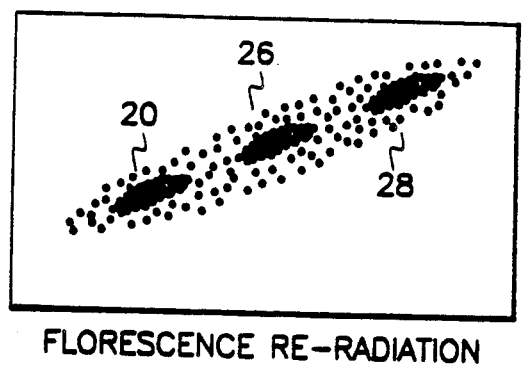
FIG. 2a illustrates fluorescent re-radiation of molecules after excitation by the light source.
Figure 2B:
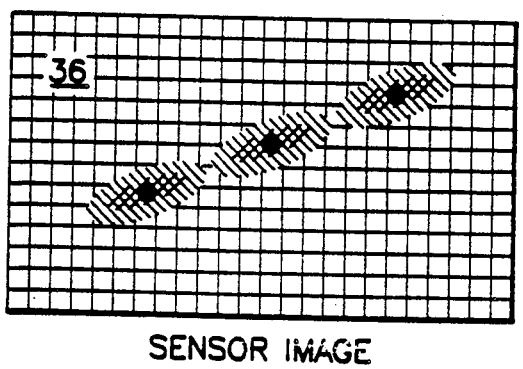
FIG. 2b is an example of an image on the sensor.
Figure 2C:
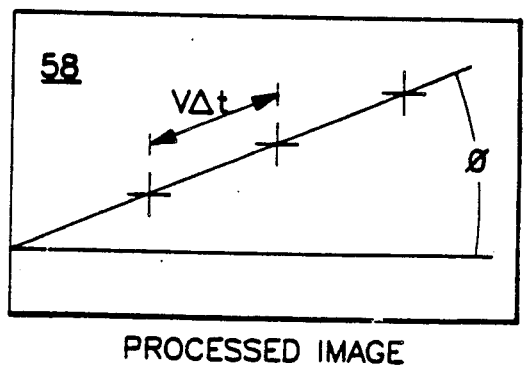
FIG. 2c is a processed image illustrating some of the measured parameters.

The velocity of spots 20, 26 and 28 is the relative velocity between the gas flow and measurement system 34. The output from imaging sensor 30 is processed by processor 60 to calculate the two-dimensional projected angular relationship (i.e., the angle of attack or angle of sideslip) between the sensor or platform axes x and y and the gas flow vector v by measuring angle $\phi$ of the best fit linear approximation, shown as a processed image on display-indicator 58 in FIG. 2c, to spots 20, 26 and 28, as shown in FIG. 2a, on sensor 36 image as shown in FIG. 2b. The two-dimensional projected velocity of the flow is determined by distance between spots 20 and 26 or between spots 26 and 28. The distance is proportional to the velocity-pulse separation product ($V \cdot \Delta t$).

Figure 3A:
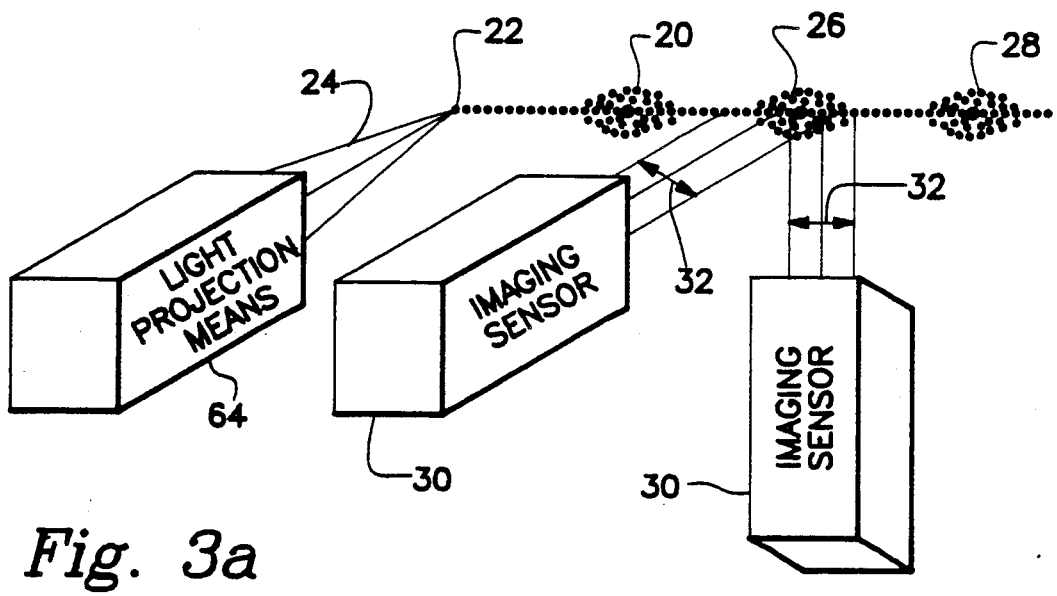
FIG. 3a and 3b show embodiments of a three-dimensional velocimeter.
Figure 3B:
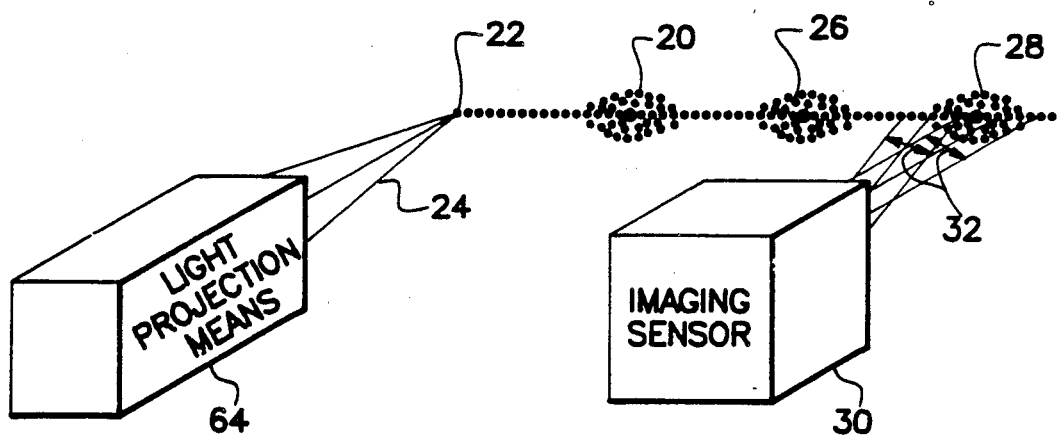

Three-dimensional sensing systems are illustrated in FIGS. 3a and 3b. The three-dimensional nature or properties of the gas or air flow can be characterized by a pair of two-dimensional imaging sensors 30, as shown in FIG. 3a, having optical or focal plane axes 62 not alined with each other (through preferably orthogonal to each other and both projected in a direction parallel to the host vehicle cross-section) Thus, the pair of sensors 30 can determine angle of attack, angle of sideslip and total flow velocity. Only one light projection means 64 is necessary whether there is one or two sensors 30. However, two light projection means 64 may be paired with two sensors 30 sensing in quite diverse directions or at different locations. Also, the three-dimensional sensing can be characterized by a pair of arrays 36 offset from each other but utilizing the same optical system 48, as depicted in FIG. 3b.

Array 36 may be constructed of photo-diodes, charge-coupled detectors or other light detectors. The detectors may be combined with micro-channel intensifiers or other photo-multiplication means if desired or needed as application of the velocimeter warrants. The above-noted embodiment 10 uses a two-dimensional array 36; however, array 36 may be a one-dimensional or a linear array together with a timing mechanism that coordinates with the times of the laser pulses 12, 14 16 and 18 that excite areas of molecules 20, 26 and 28.

Graph 11 of FIG. 1b shows the magnitude of the fluorescent output (1(r)) versus the distance ($V \cdot \Delta t$ or r) between amplitude peaks 52, 54 and 56 of illumination of the excited molecules 20, 26 and 28 in a plane incorporating peaks 52, 54 and 56. $V \cdot \Delta t$ or r is in the direction of flow of the observed gas. The "x" of the x-y coordinates in FIG. 1b is an axis parallel to the longitudinal axis of the host vehicle or platform The "y" of the same coordinates is an axis parallel to a cross-section plane of the host vehicle or platform and is in the "vertical" direction. The "r" is determined by the focal plane coordinates and the optical expansion ratio (i.e., field of view) of optical system 48 and array 36. The distance of the measured gas flow from the host vehicle is indicated by the focus point of optics system 48 of velocimeter 10. Angle $\phi$ is the angle between the x axis and the direction of the gas flow molecules 20, 26 and 28. Angle $\phi$ may be in any quadrant of the x-y coordinates. Angle $\phi$ on a linear or one-dimensional array is determined from the location of the highest level detected signal on the array.

V is a vector of the gas flow that is calculated in processor 60 and displayed on display-indictor 58. $\Delta t$ is a scalar indicating the measured time period from the centers of illumination of molecules 20, 26 and 28. The product $V \cdot \Delta t$ is a position vector of the from one point to another in the observed gas flow.

The basis of noninvasiveness of gas measurement outside a vehicle carrying velocimeter 10 is peculiarly characteristic to the present invention. The obvious noninvasive feature is the lack of probes and is a feature of some related art systems. The significant, but unobvious, noninvasive feature is the effective nondisturbance of the measured flow to the extent that reasonably accurate measurements of the gas flow can be attained even at high altitudes (i.e., greater than 200 thousand feet above sea level). If a very high-powered laser is pulsed into a small spot in the gas flow, the high power density heats the gas and the gas becomes more rarified resulting in a change of the index of refraction of the gas. Also the heat of the high-powered laser causes flow disruption. For more useful and reliable accuracy, measurements of gas flow should be made without perturbing the flow and changing the index of refraction. The perturbance of gas flow and rarification of the gas are invasive effects which reduce the signal-to-nose ratio and accuracy of the measuring system, although a more concentrated or smaller spot should increase the signal-to-noise ratio. The size of the spot downstream where it is detected determines the possible accuracy with which the measuring system can measure the gas flow (i.e., measure distance $V \cdot \Delta t$ between spots). The spot would more greatly increase in size due to diffusion and mixing caused by perturbation of the gas flow or rarification of the gas. Another factor contributing to spot diffusion of the gas is turbulence of the host vehicle of the velocimeter. Thus, the laser spot needs to be focused at a distance sufficient enough to maintain laminar or free stream flow of the gas measured.

The light source may be a laser, not a high powered laser, but medium powered, or may be a flash lamp, having a short pulse width and an appropriate focus. If the source is a laser, coherence is not critical, that is, a narrow line width is not mandatory.

I claim:

1. A noninvasive pulsed fluorescence gas velocimeter comprising:

pulsed light projection means, mounted on a platform, for projecting a light beam pulsed at regular time intervals to excite molecules at a fixed spot relative to the platform in a gas flow so that the molecules radiate fluorescence;

sensor means, mounted on the platform, for detecting light of fluorescent scattering from the molecules excited by said pulsed light projection means and for determining time periods between occurrences of the light from the fluorescent scattering; and processing means, connected to said sensor means, for indicating velocity and direction of the molecules in the gas flow from the time periods between occurrences of the light from the fluorescent scattering.

2. Apparatus of claim 1 wherein:

said pulsed light projection means comprises a light source means and a first optical means, said first optical means positioned between said light source means and the molecules in the gas flow, for generating and focusing the light beam on the molecules; and said sensor means comprises a detector means for fluorescence detecting and a second optical means, said second optical means positioned between said detector means and the molecules in the gas flow, for focusing the light of the fluorescent scattering from the molecules onto said detector means.

3. Apparatus of claim 2 wherein said second optical means comprises a Rayleigh filter means for absorbing light of the same frequency as said light source means and transmitting the light of the fluorescent scattering.

4. Apparatus of claim 3 wherein said processing means comprises:
a processor, connected to said detector means, for processing fluorescent light data from said detector means into measurement parameter data; and
display-indicator means, connected to said processor, for indicating gas flow parameters such as velocity including direction of gas flow.

5. Apparatus of claim 4 wherein said detector means has a two-dimensional array.

6. Apparatus of claim 4 wherein:
said processor is connected to said light source means;
said detector means is a linear (one-dimensional) array.

7. Apparatus of claim 4 wherein said light source means is a laser light source.

8. Apparatus of claim 4 wherein said light source is a non-laser flash unit.

9. A noninvasive pulsed fluorescence gas velocimeter comprising:
a light source emitting light bursts and said light bursts occurring between equal periods of time;
a first optical system, positioned between said light source and a gas flow to be measured, for focusing the light bursts onto a spot within the gas flow so that said light bursts excite molecules which in response radiate fluorescent light;
a detector array for detecting fluorescent light from the excited molecules, for determining time periods between occurrences of fluorescent light within a fixed filed of view, and for determining spatial distances between spots of the occurrences of fluorescent light within the gas flow;
a second optical system, positioned between said detector array and the gas flow, for selecting the field of view of the gas flow incorporating the excited molecules which radiate fluorescent light, and focusing the fluorescent light on said detector array;
a processor, connected to said detector array, for receiving data signals representing time periods between the occurrences of the fluorescent light and spatial distances between the spots of the occurrences of the fluorescent light from said detector array and processing said data signals into measurement parameters of velocity and direction of the gas flow; and
a display-indicator connected to said processor.

10. Apparatus of claim 9 wherein said light source is a laser.

11. Apparatus of claim 9 further comprising:
a first optical window between said first optical system and the gas flow; and
a second optical window between said second optical system and the gas flow, wherein said first and second optical windows may isolate said velocimeter within a vehicle from the gas flow.

12. A noninvasive pulsed fluorescence gas velocimeter comprising:
a light transmitter for periodically transmitting light to a spot within a gas flow to be measured and exciting molecules within the gas so that the molecules in turn radiate fluorescence;
a first detector having a first field of view, for detecting fluorescence from the molecules and determining time periods between occurrences of the fluorescence within the first filed of view, so as to result in a first set of two-dimensional data;
a second detector having a second filed of view, for detecting fluorescence from the molecules and determining time periods between occurrences of the fluorescence within the second field of view, so as to result in a second set of two-dimensional data;
a processor connected to said first and second detectors, for combining and processing the first and second sets of two-dimensional data into three-dimensional measurement data about angle of attack and total flow velocity of the gas flow; and
an indicator connected to said processor.

13. A method for noninvasive fluorescent measurement of velocity, including direction, of flow of a gas, relative to a platform, comprising:
exciting molecules with a nonperturbing light at a fixed spot relative to said platform, on a periodic time basis, so that said molecules radiate fluorescence;
detecting the fluorescence of the molecules and determining time periods between occurrences of the fluorescence within a fixed filed of view relative to said platform; and
calculating the velocity, including direction, of the gas flow, relative to said platform, from data of said detecting and determining within the field of view.

14. A noninvasive pulsed fluorescence gas velocimeter comprising:
pulsed light projection means, mounted on a platform, for projecting a light beam to excite molecules in a gas flow;
sensor means, mounted on the platform, for detecting light of fluorescent scattering from the molecules excited by said pulsed light projection means; and
processing means, connected to said sensor means, for indicating velocity and direction of the molecules in the gas flow; and
wherein:
said pulsed light projection means comprises a light source means and a first optical means, said first optical means positioned between said light source means and the molecules in the gas flow, for generating and focusing the light beam on the molecules;
said sensor means comprises a detector means for fluorescence detecting and a second optical means, said second optical means positioned between said detector means and the molecules in the gas flow, for focusing the light of the fluorescent scattering from the molecules onto said detector means; and
said second optical means comprises a Rayleight filter means for absorbing light of the same frequency as said light source means and transmitting the light of the fluorescent scattering.

15. Apparatus of claim 14 wherein said processing means comprises:
- a processor, connected to said detector means, for processing fluorescent light data from said detector means into measurement parameter data; and
- display-indicator means, connected to said processor, for indicating gas flow parameters such as velocity including direction of gas flow.

16. Apparatus of claim 15 wherein said detector means has a two-dimensional array.

17. Apparatus of claim 15 wherein:
- said processor is connected to said light source means;
- said detector means is a linear (one-dimensional) array.

18. Apparatus of claim 15 wherein said light source means is a laser light source.

19. Apparatus of claim 15 wherein said light source is a non-laser flash unit.

20. A noninvasive pulsed fluorescence gas velocimeter comprising:
- a light transmitter for periodically transmitting light to a spot within a gas flow to be measured and exciting molecules within the gas so that the molecules in turn radiate fluorescence;
- a first detector having a first field of view, for detecting fluorescence from the molecules and determining spatial distances between occurrences of the fluorescence within the first field of view, so as to result in a first set of two-dimensional data;
- a second detector having a second field of view, for detecting fluorescence from the molecules and determining spatial distances between occurrences of the fluorescence within the second filed of view, so as to result in a second set of two-dimensional data;
- a processor connected to said first and second detectors, for combining and processing the first and second sets of two-dimensional data into three-dimensional measurement data about angle of attack and total flow velocity of the gas flow; and
- an indicator connected to said processor.

21. A method for noninvasive fluorescent measurement of velocity, including direction, of flow of a gas, relative to a platform, comprising:
- exciting molecules with a nonperturbing light at a fixed spot relative to said platform, on a periodic time basis, so that said molecules radiate fluorescence:
- detecting the fluorescence of the molecules and determining spatial distances between occurrences of the fluorescence within a fixed field of view relative to said platform; and
- calculating the velocity, including direction, of the gas flow, relative to said platform, from data of said detecting and determining within the field of view.

22. A noninvasive pulsed fluorescence gas velocimeter comprising:
- pulsed light projection means, mounted on a platform, for projecting a light beam pulsed at time intervals to excite molecules at a fixed spot relative to the platform in a gas flow so that the molecules radiate fluorescence;
- sensor means, mounted on the platform, for detecting light of fluorescent scattering from the molecules excited by said pulsed light projection means and for determining spatial orientations of the light from the fluorescent scattering; and
- processing means, connected to said sensor means, for indicating velocity and direction of the molecules in the gas flow from the spatial orientations of the light from the fluorescent scattering.

* * * * *

UNITED STATES PATENT AND TRADEMARK OFFICE
CERTIFICATE OF CORRECTION

PATENT NO. : 5,002,389
DATED : March 26, 1991
INVENTOR(S) : EARL T. BENSER

It is certified that error appears in the above-identified patent and that said Letters Patent is hereby corrected as shown below:

Column 5, line 44, cancel "filed" and substitute --field--.

Column 6, line 12, cancel "filed" and substitute --field--.

Column 6, line 14, cancel "filed" and substitute --field--.

Column 6, line 34, cancel "filed" and substitute --field--.

Column 6, line 65, cancel "Rayleight" and substitute --Rayleigh--.

Column 7, line 35, cancel "filed" and substitute --field--.

Signed and Sealed this

Twentieth Day of October, 1992

*Attest:*

DOUGLAS B. COMER

*Attesting Officer*     *Acting Commissioner of Patents and Trademarks*